UNITED STATES PATENT OFFICE.

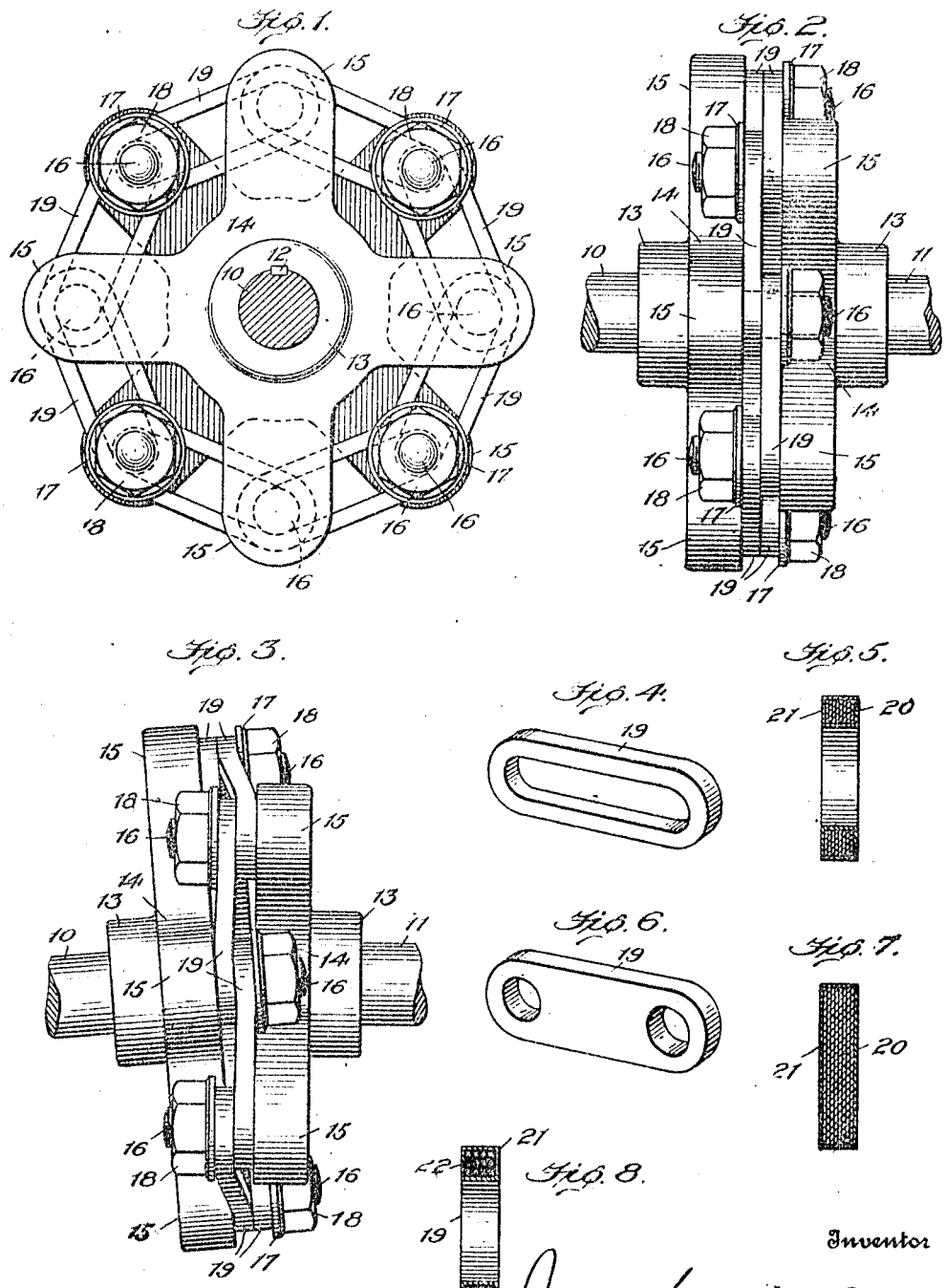

CURT KUENTZEL, OF YOUNGSTOWN, OHIO, ASSIGNOR TO THE REPUBLIC RUBBER COMPANY, OF YOUNGSTOWN, OHIO, A CORPORATION OF OHIO.

FLEXIBLE SHAFT-COUPLING.

1,316,903.　　　　　Specification of Letters Patent.　　Patented Sept. 23, 1919.

Application filed March 29, 1917.　Serial No. 158,350.

*To all whom it may concern:*

Be it known that I, CURT KUENTZEL, a subject of the Emperor of Germany, residing at Youngstown, in the county of Mahoning and State of Ohio, have invented certain new and useful Improvements in Flexible Shaft-Couplings; and I do hereby declare the following to be a full, clear, and exact description of the invention, such as will enable others skilled in the art to which it appertains to make and use the same.

My present invention relates to power transmitting shafts, but more particularly stated it relates to new and improved means for flexibly coupling together or joining the adjacent ends of shaft sections, and has for an object the simplification of such couplings.

As a further object the invention contemplates the production of flexible shaft-couplings which are peculiarly efficient, durable and economical in form of construction.

As a further object the present invention provides a flexible element made up of a plurality of independent members, any one of which may be quickly removed and replaced in event of wear or breakage, without the necessity and expense of removing and replacing the whole.

A further object is the production of couplings, of the character indicated, capable of transmitting power from a prime mover (not shown) with a marked degree of flexibility, a certain degree of freedom for end play, and at the same time a certain amount of automatic compensation for differences in alinement, or premeditated changes of direction in a line of shafting.

With the foregoing and other objects in view, the invention will be hereinafter particularly described and then pointed out by the appended claims.

In the accompanying drawings which form part of this application for Letters Patent, and whereon like numerals indicate corresponding parts in the several views:

Figure 1 is a face view of coupling members the shaft being shown in section.

Fig. 2 is an edge view or side elevation of parts shown by Fig. 1.

Fig. 3 is a view similar to Fig. 2 with parts in their relative positions when operating upon shaft sections not in 'alinement.

Fig. 4 is a perspective view showing one flexible driving link detached.

Fig. 5 is a transverse sectional view through the link shown by Fig. 4, but upon a somewhat enlarged scale for the sake of clearance.

Fig. 6 is also a perspective view showing one modified form of flexible driving link.

Fig. 7 is a transverse sectional view through the link shown by Fig. 6, also on a relatively enlarged scale, and, Fig. 8 is a transverse section through a link such as shown by Fig. 4 but embodying another modified form of construction.

Reference being had to the drawings and numerals thereon, 10 and 11 indicate adjacent ends respectively, of a sectional power transmitting shaft. The coupling members with which these shaft sections are equipped are structurally identical, and for this reason a description of one set will suffice for both.

Upon each shaft section 10 and 11 are affixed, by keys 12, or otherwise, a central hub 13 forming part of a radial enlargement 14 which in the present illustrations takes the form of a plurality of equidistant radial arms 15 in which are mounted studs or pins 16 carrying on their outer screw-threaded ends suitable washers 17 and nuts 18 for purposes which will later appear.

When properly assembled as shown by Fig. 2, the aforesaid radial enlargements, or sets of radial arms 15, are spaced apart slightly in adjacent planes, the arms of one set being staggered with relation to those of the other set as shown by Fig. 1 of the drawings. And, projecting inwardly from the opposing faces of each radial enlargement or set of arms 15 are the pins 16 aforesaid, the pins of one set of said arms being operatively connected in pairs with those of the other set of said arms by a series of overlapping continuous flexible and nonstretchable links 19, as shown by Figs. 4, 5, 6, 7 and 8.

These links 19 collectively encircle the entire structure, there being two upon each pin 16 in which position they are removably retained by means of the washers 17 and nuts 18, hereinbefore mentioned, which also prevent accidental separation of the coupling members as a whole. The said links may be of any flexible material and of various forms. They may be elliptical as shown by Fig. 4, or of practically solid formation as shown by Fig. 6, but in either event they are preferably made of laminations of rubber coated fabric 20 inclosed within an envelop of rubber or other suitable moisture-proof material 21. Or, as shown by Fig. 8 the said links 19 may if desired be made of rubberized cord strands or wire strands 22 inclosed as before described by a moisture-proof covering.

This being a description of my improved form of flexible shaft coupling its use and operation are quite obvious, and need not therefore be dwelt upon at much length.

Rotation of the shaft section 10 in either direction drives its coacting section 11 by agency of the interposed flexible links 19; and, because of that flexibility, as indicated by Fig. 3 of the drawings, it matters not if the said shaft sections are considerably out of actual alinement. Moreover, a slight degree of torsional elasticity is thus obtained, slight end thrusts of the shaft sections permitted, errors of alinement compensated for and a general increase in efficiency and durability obtained.

Having thus described my invention, what I now claim and desire to secure by Letters Patent is:

1. In a flexible shaft-coupling the combination with a sectional shaft, of radial arms at the coupling ends of said shaft sections, pins projecting inwardly from the opposing faces of said arms, and flexible non-stretchable links connecting the pins of one set of arms with those of the other set of arms in pairs said links comprising a laminated body inclosed within an envelop of suitable moisture-proof material.

2. In a flexible shaft coupling the combination with driving and driven shaft sections having enlargements at their adjacent ends, respectively, pins projecting inwardly and alternately from the opposing faces at said enlargements, and flexible, non-stretchable, overlapping links connecting the pins of one enlargement with those of the other enlargement in pairs.

3. In a flexible shaft coupling the combination with driving and driven shaft sections having quadriform enlargements at their adjacent ends respectively, pins projecting inwardly and alternately from outermost positions of each quadriform enlargement, and flexible, non-stretchable, overlapping links connecting the pins of one enlargement with those of the other enlargement in pairs and in substantially a circular series.

4. In a flexible shaft coupling the combination with driving and driven shaft sections having enlargements comprising radial arms at their adjacent ends respectively, pins projecting inwardly and alternately from opposing surfaces of said arms, flexible, non-stretchable, overlapping links connecting the pins of one enlargement with those of the other enlargement in pairs, and a moisture-proof envelop inclosing each of said links.

In testimony whereof I affix my signature in presence of two subscribing witnesses.

CURT KUENTZEL.

Witnesses:
FRANK DUNN,
W. DUNN.